United States Patent Office 3,515,700
Patented June 2, 1970

3,515,700
PROCESS FOR THE PREPARATION OF POLYESTER FOR SLIDEABLE FILM
Rei Yokouchi, Yoshimitsu Ichikawa, Syotaro Izeki, and Takeo Fusayama, Mishima-shi, Shizuoka-ken, Japan, assignors to Toyo Rayon Kabushiki Kaisha, Tokyo, Japan, a corporation of Japan
No Drawing. Continuation-in-part of application Ser. No. 364,837, May 4, 1964. This application Dec. 31, 1968, Ser. No. 788,315
Claims priority, application Japan, May 8, 1963, 38/23,524
Int. Cl. C08g 17/015
U.S. Cl. 260—75                    9 Claims

ABSTRACT OF THE DISCLOSURE

A method for the preparation of polymeric polyesters which may be shaped into a film of excellent sliding characteristics. More specifically, the method relates to the preparation of polyesters for highly slidable film which comprises contacting difunctional carboxylic acid or ester-forming functional derivatives thereof with a diol in the presence of a catalyst consisting of a zinc compound, an alkaline earth metal compound, and a titanium compound.

---

This application is a continuation-in-part of copending application Ser. No. 364,837 filed May 4, 1964, now abandoned.

This invention relates to a process for the preparation of polyesters suited to be shaped into film of good sliding characteristics. More particularly, the invention relates to a process for the preparation of polyesters for highly slideable film which is characterized in that, at the time of preparation of film-forming polyester from one or more dibasic carboxylic acids or functional derivatives thereof and diols, at least three compounds, each selected from zinc compounds, titanium compounds and alkaline earth metal compounds, are conjointly used as the catalyst.

Heretofore, industrial scale production of a polyester usually is performed by the steps of preparing a low molecular weight polymer from a dicarboxylic acid or its derivative and a diol, or from an oxycarboxylic acid, by means of esterification or ester-interchange reaction and further polymerization of the obtained polymer to raise its degree of polymerization. For example, polyethylene terephthalate is conventionally prepared by the process comprising heating terephthalic acid, or a derivative thereof, preferably dimethyl terephthalate, with ethylene glycol to 150–250° C., thoroughly distilling off the methanol formed as the result of the reaction, and thereafter polymerizing the product at 260–290° C. under reduced pressure while distilling off ethylene glycol.

In such a process, a catalyst is usually used to accelerate the reaction. It is known that while properties of the polyester such as dyeability and melt viscosity can be considerably improved by copolymerization thereof with other components or post treatments, its essential properties such as color tone, electrical properties, photo- and heat-resistance, etc. are influenced by the catalyst or additives used. Thus, selection of the catalyst is very important, and many compounds singly or in combination have been proposed for the catalyst or catalyst system.

When the polyester is intended to be a material for film, the properties of the film may be varied for each specific usage depending on the characteristics of the material. In that case, unless the film surface is slideable, adhesion between the films and increased friction between the film and hand or machine tend to be caused, and the operational deficiency is greatly reduced. That tendency further increases as the thickness of the film becomes smaller. However, in the past scarcely any research work has been done to improve the slideability of the film surface.

We recognized this problem and from the standpoint that in order to make film surface highly slideable while retaining the original characteristics suited for each specific use, its kinetic friction coefficient should be made small, carried out an extensive research. As the result, we came to know that the kinetic friction coefficient of polyester film is greatly influenced by the type of catalyst system used during the polyester preparation, while it also is somewhat varied by film-forming conditions.

To wit, the process of the invention is characterized in that, when the film-formable polyester is prepared from a dibasic carboxylic acid or a derivative thereof with a diol in accordance with a known process, at least three compounds each selected from zinc compounds, titanium compounds and alkaline earth metal compounds are conjointly used as the catalyst.

With lack of any one of the three types of the compounds constituting the catalyst system of this invention, the object of the invention would not be achieved, while by suitably selecting specific combination, slideability of the film can be further improved.

We first thought that the presence of very minute particles in the polyester may be useful to lessen the kinetic friction coefficient of the polyester film, and, based on that concept, experimented on addition of titanium oxide, silicic anhydride, calcium sulfate, etc. which are conventionally used as the additives for delustering or improving drawability of fiber-forming polyesters. However, the addition did cause formation of projections on the film surface but did not make the kinetic friction coefficient of the film small. On the contrary, sometimes they became obstacles to formation of a very thin polyester film as the portion of the added small particles aggregate during the synthesis of the polyester and consequently coarse, large particles were present dispersed on the film surface. Again, in such a case, transparency of the film was substantially impaired. This is indeed a serious deficiency. Thus, it was found that the addition rather degrades the properties of the film.

It is also known that alkaline earth metals, particularly calcium, are separated in the form of carboxylates insoluble in polyesters and form alien substances. Various methods have been proposed to reduce the alien substance. We on the contrary considered the possibility of utilization of the alien substance caused by the use of alkaline earth metal compounds as the catalyst for a beneficial purpose, that is, for causing presence of extremely small particles in polyesters. However, we found that according to the conventional method of synthesis of polyesters in which an alkaline earth metal compound is used as the ester-interchange catalyst and an antimony compound is used as the polymerization catalyst, the particles produced do form projections on the film surface but they are hardly effective for reducing the kinetic friction coefficient, while rendering the film opaque.

We previously found that the conjoint use of zinc chloride and an organic titanium compound unusually increases the respective catalytic activity of each of the two compounds, while lessening the opacity in the product polyester and producing coarse, large particles which normally accompany the use of organic titanium compounds. After further extensive research in the field, we came to know that this effect of zinc chloride is not present in organic titanium compounds alone, but it is manifested also by any of the titanium compounds. Again, not only zinc chloride, but also other zinc compounds have the similar effect although to a somewhat lesser degree. We therefore experimented on the use of a catalyst system composed of a zinc compound and a titanium compound in an attempt to utilize the effect of the former to lessen the formation of course foreign matter particles, but such would not sufficiently improve the kinetic friction coefficient of the resultant polyester film.

Whereas, it is now found that the concurrent use of a zinc compound, a titanium compound and an alkaline earth metal compound can quite satisfactorily lower the kinetic friction coefficient of the film without much impairment of transparency of the film.

The process of this invention now will be explained in detail.

In this invention, the acid component for the polyester formation is a dibasic acid having one or two carboxyl groups. Such dibasic acids will hereafter be referred to merely as dibasic carboxylic acid.

Examples of the dibasic carboxylic acids are as follows: aliphatic carboxylic acids such as oxalic, adipic, azelaic and sebacic acids; aromatic dicarboxylic acids such as terephthalic, isophthalic, phthalic, 2,6-naphthalene dicarboxylic and diphenyl dicarboxylic acids; aliphatic dibasic carboxylic acids such as a dicarboxylic acid having an aliphatic ring, aromatic dibasic carboxylic acids and/or cycloaliphatic dibasic carboxylic acids such as 1,2-cyclobutane dicarboxylic acid. These dibasic carboxylic acids can be used singly or as mixtures of two or more types.

It is also possible in this invention to use dibasic acids having one carboxyl group such as p-hydroxybenzoic and vanillic acids.

Also, ester-forming functional derivatives of the foregoing dibasic carboxylic acids, such as lower alkyl esters, may also be used.

As the diols to be used in this invention, any one or more of ethylene glycol, diethylene glycol, propylene, glycol, polyethylene glycol, butanediol, thioglycol, p-xylylene glycol and 1,4-cyclohexane dimethanol may be used.

Again, either in place of, or in addition to, these dibasic carboxylic acids or functional derivatives thereof, one or more dibasic carboxylic acids containing other elements than hydrogen and oxygen may be used. Examples of such are: compounds containing, for example, sulfur or nitrogen of the following structural formulae

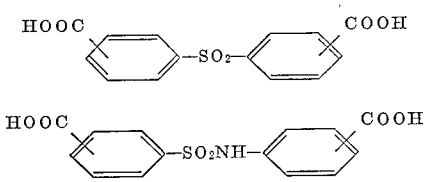

5-sodium sulfoisophthalic, 5-methyl sulfoisophthalic, trimellitic, pyromellitic, p-oxyethoxy benzoic, vanillic, p-oxyethoxy-m-chlorbenzoic, p-oxymethylbenzoic and glycolic acids, and their ester-forming functional derivatives.

Again, a portion of the said diol or diols or functional derivatives thereof, for example, up to 30%, may be substituted by one or more polyvalent oxycompounds such as 2,2-bis(p-2-oxyphenyl)propane, 2,2-bis(p-oxyethoxyphenyl)propane, glycerin and pentaerythritol.

From suitable combinations of these components, many polyesters can be synthesized.

The film-forming polyester referred to in this invention may be a homopolyester or a copolyester. For example, it may be a homopolyester such as polyethylene terephthalate (composed of ethylene glycol and terephthalic acid), polyethylene adipate (composed of ethylene glycol and adipic acid), polyethylene sebacate (composed of ethylene glycol and sebacic acid) and polyethylene isophthalate (composed of ethylene glycol and isophthalic acid); or a copolyester such as polyethylene terephthalate-isophthalate (composed of ethylene glycol, terephthalic acid and isophthalic acid), polyethylene terephthalate-5-sodium sulfoisophthalate (composed of ethylene glycol, terephthalic acid and 5-sodium sulfoisophthalic acid) and polyethylene terephthalate - p - oxyethoxybenzoate (composed of ethylene glycol, terephthalic acid and p-oxyethoxybenzoic acid). Of course these polyesters are named only for the purpose of illustration, and this invention is by no means limited to the polyesters above-named.

However, this invention is particularly effective for the formation of polyester in which at least 70% of the polyester-constituting unit is ethylene terephthalate. This gives a highly slideable polyester film.

Next the catalyst to be used in this invention will be explained.

As already mentioned, in this invention at least three compounds each selected from zinc compounds, titanium compounds and alkaline earth metal compounds are used as the catalyst system.

The organic zinc compounds referred herein include zinc compounds such as the zinc salt of 2-mercaptobenzothiazol, carboxylic acid salts of zinc such as zinc acetate, zinc caproate, zinc adipate and zinc benzoate; inorganic acid salts such as zinc chloride, zinc carbonate and zinc borate; zinc oxide. One or more of these compounds are used as the zinc compounds.

As the titanium compounds, one or more of the compounds are selected from the group consisting of organic titanium compounds of the general formula $$Ti(OR)_4$$

wherein R stands for alkyl, aryl, aralkyl, acyl, aroyl or hydroxyalkyl groups having 1–20 carbon atoms, which may be the same or different, titanium trichloride; and ammonium salts, alkali salts and alkaline earth metal salts of titanic acid.

The said organic titanium compounds includes tetramethyl titanate, tetraethyl titanate, methyl triphenyl titanate, dipropyl dibenzyl titanate, dibutyl di(-2-hydroxyethyl)titanate, diisopropoxytitanium acetate, dibutoxytitanium benzoate, methyl(tribenzoyl)titanate, and the condensation products thereof.

As the alkaline earth metal compounds, one or more of the compounds are selected from the group consisting of carboxylates, aluminates, hydrides and oxides of Ca, Ba and Sr.

All of these zinc compounds, titanium compounds and alkaline earth metal compounds may be added at the time of esterification or ester-interchange reaction, or one or two may be added at that time and the rest at the time of polymerization reaction.

It is also permissible to additionally use a metallic compound such as a phosphorus compound which is conventionally used in polyester production. However such a practice is not always preferred since it tends to impair slideability of the product film and form coarse foreign matter, although transparency of the film is somewhat improved.

Again in the process of this invention, it is preferred to select such zinc compounds having high polymerization reaction accelerating effect as, for example, zinc chloride and zinc salt of 2-mercaptobenzothiazol, in order to economically produce polyester. For producing polyesters containing little coarse foreign matter, it is preferred to use an organic titanate as the titanium compound and a calcium compound as the alkaline earth metal compound.

The polymerization reaction may be carried out at temperatures either higher or lower than the melting point of the polyester.

The amount of the mixed catalyst to be used in this invention is within the range of $X+Y+Z=0.02–0.6$, preferably 0.06–0.4, and $6X \geq Y+Z \geq X$ when each the amount of zinc compound, alkaline earth metal compound and titanium compound to the total acid component constituting the polyester is expressed, in respective order, as X, Y and Z percent by weight.

Thus, the generally preferred range of use of each of the metal compounds is:

X=0.005–0.1
Y=0.01–04
Z=0.005–0.2

In this invention, in the presence of the mixed catalyst as described in the above, the foregoing dibasic carboxylic acid or acids or a functional derivative or derivatives thereof are reacted with a diol or diols, under such reaction conditions known per se for production of polyesters. Normally the reaction is performed in two stages, that is, by the first stage reaction in which a dibasic carboxylic acid or a functional derivative thereof is reacted with a diol to form a diester of the dibasic carboxylic acid or a low polymer thereof and by the second stage reaction in which the reaction product of the first stage is further heated at the reduced pressure and poly-condensed. Of course these reactions may be performed continuously. Further, other reaction conditions such as temperature and pressure vary depending on the type of the specific dibasic carboxylic acid or derivative thereof and the diol employed.

In the past many proposals have been made as to the processes for preparing polyesters suited as materials for polyester film of improved electrical properties or for that of improved transparency, but none has ever been made before as to the manufacture of polyester for highly slideable film as the present invention.

The alkaline earth metal compounds used in this invention are well known as the catalyst useful for polyester production, and most of the zinc compounds and titanium compounds are also known as catalysts. However, the conjoint use of these three types of compounds is not known, and of course, the fact that the conjoint use of those three types of compounds gives polyester suitable as the material for highly slideable film is entirely unknown.

Whereas, according to this invention, by the use of the catalyst system containing at least three compounds each selected from zinc compounds, titanium compounds and alkaline earth metal compounds, polyester film having sufficient slideability is obtained.

Further, this invention is particularly suited when the primary object is to obtain polyester film having high slideability, even at the sacrifice of transparency to a slight degree.

EXAMPLES 1–7

In a stainless steel vessel provided with a stirrer and a rectifying column, 1500 parts of dimethyl terephthalate, 1050 parts of ethylene glycol and the catalyst were subjected to ester-interchange reaction at 150–230° C. while the methanol formed was continuously withdrawn. After distilling off of the methanol was completed, the product was transferred into a stainless steel polymerization reaction tank provided with a stirrer and a rectifying column, the temperature of which was gradually raised to 275° C. within an hour while the pressure was reduced. At 275° C. and in vacuo finally maintained below 1 mm. Hg, the polymerization was performed.

The intrinsic viscosity of the obtained polymer was measured at 25° C. in a mixed solvent of phenol and ethane tetrachloride at the ratio of 1:1.

The number of foreign matter particles in the polymer was determined by counting the number of particles of size $20\mu$ or greater contained in 10 g. of the polymer by means of binocular stereomicroscope.

The kinetic friction coefficient was determined by the following manner. The polyester was shaped into film of $6\mu$ thickness, and two pieces of the film were rubbed together. The kinetic friction coefficient was calculated from the following equation:

$$T/To = E\mu\theta$$

wherein $\theta$=angle of contact (radian)
$\mu$=kinetic friction coefficient
$To$=initial load (g.)
$T$=produced load (g.)

The opacity was measured with opacity measuring apparatus of Nihon Kogaku in accordance with ASTM D–1003–52 standard as to the film of $6\mu$ thickness.

| Example No. | Catalyst and the amount added (part by weight) | Ester-interchange reaction time (hr.) | Polymerization time (hr.) | Intrinsic viscosity ($\eta$) | Number of foreign matter | Opacity (percent) | Kinetic friction coefficient ($\mu$) |
|---|---|---|---|---|---|---|---|
| 1 | ZnCl$_2$, 0.45<br>Tetrabutyl titanate (TBT), 0.15<br>Ca(OAc)$_2$·H$_2$O, 0.30 | 3.43 | 3.13 | 0.677 | 4 | 0.6 | 0.80 |
| 2 | ZnCl$_2$, 0.45<br>TBT, 0.30<br>Ca(OAc)$_2$·H$_2$O, 0.30 | 2.23 | 2.87 | 0.664 | 5 | 0.75 | 0.85 |
| 3 | ZnCl$_2$, 0.30<br>TBT, 0.45<br>Ca(OAc)$_2$·H$_2$O, 0.30 | 3.36 | 2.95 | 0.653 | 5 | 0.80 | 0.80 |
| 4 | ZnCl$_2$, 0.15<br>TBT, 0.75<br>Ca(OAc)$_2$·H$_2$O, 0.75 | 2.23 | 3.17 | 0.643 | 9 | 1.50 | 0.65 |
| 5 | ZnCl$_2$, 0.30<br>Tetrastearyl titanate, 0.45<br>Ca(OAc)$_2$·H$_2$O, 0.30 | 3.21 | 3.68 | 0.659 | 5 | 1.20 | 0.85 |
| 6 | ZnCl$_2$, 0.30<br>TBT, 0.45<br>Ca(OAc)$_2$·H$_2$O, 0.30 | 3.57 | 3.12 | 0.663 | 4 | 0.95 | 0.80 |
| 7 | Zn(OAc)$_2$·H$_2$O, 0.30<br>TBT, 0.45<br>Ca(OAc)$_2$·H$_2$O, 0.30 | 2.95 | 5.54 | 0.657 | 6 | 0.80 | 0.85 |

1500 parts of dimethyl terephthalate, 1050 parts of ethylene glycol, 0.30 part of zinc chloride and 0.50 part of calcium acetate were subjected to ester-interchange reaction for 3.3 hours in the similar manner as in Example 1. To the reaction product 0.30 part of TBT were added and the product was then polymerized for 3.1 hours in the similar manner as in Example 1. The polymer had an intrinsic viscosity of 0.665 and the number of foreign matter was 5. The film produced therefrom had an opacity of 0.80% and a kinetic friction coefficient of 0.65.

EXAMPLE 9

Example 1 was repeated except that 0.2 part of phosphorous acid was added to the reactants prior to the polymerization and the polymerization time was 3.5 hours. The resultant polymer had an intrinsic viscosity of 0.658 and the number of foreign matter was 8. The film produced therefrom had an opacity of 0.6% and a kinetic friction coefficient of 1.0.

Control 1

Example 1 was repeated except that 0.60 part of zinc chloride only was used as the catalyst, and the ester-interchange time and the polymerization time were, respectively, 3.5 hours and 4.8 hours.

The resultant polymer had an intrinsic viscosity of 0.691 and the number of foreign matter was 5. The film produced therefrom had an opacity of 0.6% and a kinetic friction coefficient of 2.0.

Control 2

Example 1 was repeated except that 0.45 part of zinc chloride and 0.3 part of TBT were used as the catalyst, and the ester-interchange time and the polymerization time were, respectively, 3.5 hours and 2.8 hours. The resultant polymer had an intrinsic viscosity of 0.658 and the number of foreign matter was 7. The film produced therefrom had an opacity of 0.55% and a kinetic friction coefficient of 1.8.

Control 3

1500 parts of dimethyl terephthalate, 1050 parts of ethylene glycol and 1.35 parts of calcium acetate were subjected to 4 hours of ester-interchange reaction in the similar manner as in Example 1. The reaction product was then added with 0.45 part of antimony oxide and polymerized for 4.5 hours in the similar manner as in Example 1. The resultant polymer had an intrinsic viscosity of 0.670 and was opaque, while the film produced therefrom was also opaque and had a kinetic friction coefficient of 1.9.

EXAMPLE 10

100 parts of dimethyl terephthalate, 10 parts of dimethyl adipate, 95 parts of ethylene glycol, 0.012 part of zinc chloride, 0.048 part of TBT and 0.06 part of calcium acetate were subjected to ester-interchange reaction for 2.3 hours and then were polymerized for 3.3 hours in the similar manner as in Example 1. The resultant polymer had a softening point of 235° C. and an intrinsic viscosity of 0.666 and the number of foreign matter was 8. The film produced therefrom had an opacity of 1.41% and a kinetic friction coefficient of 0.70.

EXAMPLE 11

In a stainless steel autoclave provided with a stirrer and a device for distilling off of water, 100 parts of terephthalic acid, 50 parts of ethylene glycol, 0.05 part of calcium acetate and 0.02 part of zinc chloride were subjected to esterification for 5 hours at 240° C., while the inside pressure of the autoclave was maintained at 4 kg./cm.² The reaction product was then added with 0.05 part of TBT and transferred to a similar polymerization reaction tank as used in Example 1 to be polymerized for 3.6 hours in the similar manner as in Example 1. The resultant polymer had a softening point of 252° C. and an intrinsic viscosity of 0.657, and the number of foreign matter was 8. The film produced therefrom had an opacity of 1.65% and a kinetic friction coefficient of 0.65.

EXAMPLE 12

100 parts of sebacic acid and 200 parts of ethylene glycol were esterified for four hours at the boiling point of ethylene glycol in the presence of 0.06 part of calcium acetate. The reaction product was added with 0.03 part of zinc chloride and 0.08 part of TBT, and polymerized for 3.5 hours in the similar manner as in Example 1. The resultant polymer had a melting point of 72° C. and an intrinsic viscosity of 1.51, and the number of foreign matter was 4. The film obtained from this polymer was more slideable than the film of a polymer obtained from the reaction in the similar manner of 100 parts of sebacic acid, 200 parts of ethylene glycol, 0.06 part of calcium acetate and 0.03 part of antimony oxide.

We claim:
1. A process for the preparation of a film-forming polymeric polyester of a slideable film which comprises forming said film-forming polyester in a polycondensation reaction of at least one acid component selected from the group consisting of dibasic carboxylic acids having at least one carboxyl group and their ester-forming functional derivatives with at least one diol in the presence of a catalyst system comprising (a) a zinc compound selected from the group consisting of an inorganic acid salt of zinc, zinc oxide and an organic zinc compound, (b) an alkaline earth metal compound selected from the group consisting of carboxylates, aluminates, hydrides and oxides of an alkaline earth metal and (c) a titanium compound selected from the group consisting of organic titanium compounds of the formula: $Ti(OR)_4$ wherein R stands for alkyl, aryl, aralkyl, acyl, aroyl or hydroxy-alkyl groups having 1–20 carbon atoms, titanium trichloride, ammonium salts of titanic acid and alkaline earth metal salts of titanic acid, the zinc compound (X), the alkaline earth metal compound (Y) and the titanium compound (Z) being present in the amounts satisfying the formulae

$$X+Y+Z=0.2-0.6$$

and $$6X \geq Y+Z \geq X$$

in terms of percent by weight based on the total of the acid component used for the formation of the polyester.

2. The process of claim 1 wherein at least 70% of the structural unit constituting the polyester is ethylene terephthalate.

3. The process of claim 1 wherein the dibasic carboxylic acid is terephthalic acid and the diol is ethylene glycol.

4. The process of claim 1 wherein the ester-forming functional derivative of a dibasic carboxylic acid is dimethyl terephthalate and the diol is ethylene glylcol.

5. The process of claim 1 wherein $$X+Y+Z=0.06-0.4$$

6. The process of claim 1 wherein the three components constituting the catalyst system are each added to the reaction system within the range of: zinc compound, 0.005–0.1%, alkaline earth metal compound, 0.01–0.4%, and titanum compound 0.005–0.2%.

7. The process of claim 1 wherein said catalyst system comprises a zinc compound selected from the group consisting of zinc chloride and zinc salt of 2-mercaptobenzothiazole; an organic titanate; and a calcium compound.

8. The compound of claim 1 wherein said catalyst system is added on the process prior to the initiation of the polycondensation reaction.

9. The process of claim 1 wherein at least one compound of the catalyst system is added to the process prior to the initiation of the polycondensation reaction, and at least one of the other components is added at the time of the polycondensation reaction.

References Cited

UNITED STATES PATENTS 3,110,547 11/1963 Emmert.
3,245,959 4/1966 Roeser.

FOREIGN PATENTS 742,810 1/1956 Great Britain.

WILLIAM H. SHORT, Primary Examiner

L. P. QUAST, Assistant Examiner

U.S. Cl. X.R.

252—429, 430, 432, 438, 442, 461; 260—47